United States Patent Office 3,106,552
Patented Oct. 8, 1963

3,106,552
N-SUBSTITUTED AZASPIRANES AND AZASPIRANE-DIONES AND PROCESSES FOR THEIR PREPARATION
Charles H. Grogan, Falls Church, Va., and Leonard M. Rice, Baltimore, Md., assignors to The Geschickter Fund for Medical Research, Washington, D.C., a corporation of New York
No Drawing. Filed July 19, 1960, Ser. No. 43,719
4 Claims. (Cl. 260—247.2)

This invention relates to novel synthetic organic compounds having significant chemotherapeutic utility and to methods for their preparation. More particularly, this invention relates to novel azaspiranes, their simple acid addition and quaternary salts, and to novel methods for their preparation. In addition, this application presents still another inventive concept in the provision of novel intermediates for the preparation of said azaspiranes and, more particularly, to novel azaspiranediones, their simple acid addition and quaternary salts and to novel methods for their preparation.

The several inventions of the present application have a number of significant objects. A primary object of these inventions is to provide novel, physiologically active organic compounds and methods for their preparation, said compounds being characterized by their chemotherapeutic or medicinal properties and particularly by their pharmacological activity on the nervous and cardiovascular systems.

It is another principal object of the present inventions to provide novel azaspiranes having the chemotherapeutic activity recited above, their ring- and N-substituted derivatives, the simple acid addition and quaternary salts thereof, and methods for their preparation.

It is still another object of the present inventions to provide novel intermediates for the preparation of the azaspiranes mentioned above, as well as methods for the preparation of such intermediates.

It is a further object of the present inventions to provide novel azaspirane-diones and their ring- and N-substituted derivatives for use as intermediates in the preparation of the azaspiranes mentioned above, the simple acid addition and quaternary salts thereof, as well as novel methods for the preparation of said azaspirane-diones.

These and other objects of the several inventions presented in the instant application will become more apparent as the description proceeds below.

Generally speaking, the novel intermediate compounds of the present inventions are obtained by reacting an appropriate dialkyl (dialkylene) aminoalkyl (aminoalkylene) primary amine with the anhydrides of carbocyclic gem-diacetic or gem-carboxy acetic acid and heating sufficiently to cyclize the amic acid thus formed to the imide or azadione. A cyclicizing temperature of approximately 140°–220° C. is acceptable, with a temperature range of 180°–200° C. being preferred.

The novel azaspiranes of the instant inventions may, generally speaking, be prepared by reducing imides prepared as above by suitable means to obtain N-dialkyl (dialkylene) aminoalkyl (aminoalkylene)-azaspirane bases.

Both the azaspiranes and azaspirane-diones of the present inventions may be converted by appropriate means into their simple acid addition and quaternary salts.

Formula 1 illustrates the general structural formula of the azaspirane-dione intermediates of the present invention:

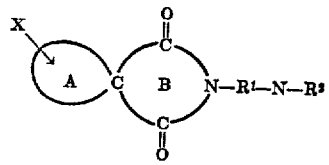

(1)

In this formula, the novel azaspirane-dione structure consists of five essential elements: (a) the ring A: (b) the ring B; (c) the spiro carbon atom connecting rings A and B; (d) the constituent X on ring A; and (e) the substituent ($R^1$—N—$R^2$) on ring B.

Ring A of the basic azaspirane-dione structure shown above comprises a hydrocarbon ring, mono or bicyclic, of at least 5 carbon atoms. While there is no particular limit on the number of carbon atoms in ring A, a ring of from 5 to 15 carbon atoms is preferred. Ring B of this structure comprises a saturated heterocyclic ring containing 5 or 6 atoms, one of which is nitrogen, the nitrogen atom being at least one carbon atom removed from the spiro carbon atom joining rings A and B, the carbons alpha, alpha' to the nitrogen atom being carbonyl carbons. As above stated, element (c) of the basic structure is the spiro carbon atom, from which the name "spiro" is derived, connecting rings A and B. Element (d), namely substituent X on ring A, represents one or more atoms and/or radicals of the group consisting of hydrogen, alkyl and alkoxy, or any combination of these. In element (e) of the basic structure, $R^1$ represents an alkyl or alkylene radical of 2 to 6 carbon atoms, one of which may be substituted with a hydroxyl group on a carbon atom at least beta to either nitrogen atom, and $R^2$ is selected from the group consisting of the alkyl and dialkylene groups, each alkyl and alkylene group of which has 1 to 6 carbon atoms, and radicals forming, together with the nitrogen atom to which they are attached, a heterocyclic group from the groups consisting of morpholine, piperidine, pyrrolidine, piperazine, and lower alkyl-substituted derivatives of said heterocyclic groups.

Formula 2 illustrates the general structural formula of the novel azaspiranes of the instant invention:

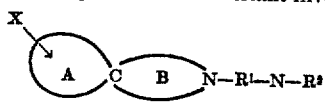

(2)

As in the case of the azaspirane-diones, the azaspirane structure shown above consists of five essential elements: (a) ring A; (b) ring B; (c) the spiro carbon atom connecting rings A and B; (d) substituent X on ring A; and (e) the N-substituted group ($R^1$—N—$R^2$). Except for element (b), namely, ring B, Formula 2 is identical to Formula 1. Ring B of the basic azaspirane structure illustrated in Formula 2 comprises a saturated heterocyclic ring containing 5 or 6 atoms, one of which is nitrogen, the nitrogen atom being at least one carbon atom removed from the spiro carbon atom joining rings A and B.

In addition to the azaspirane-diones and azaspiranes set forth above in Formulas 1 and 2, the instant inventions additionally contemplate the treatment of both the azaspiranediones and the basic azaspiranes to form simple acid addition and quaternary salts.

Formulas 3 and 4 illustrate the type and site of salt formation resulting from the appropriate treatment of the novel azaspirane-diones of the present invention:

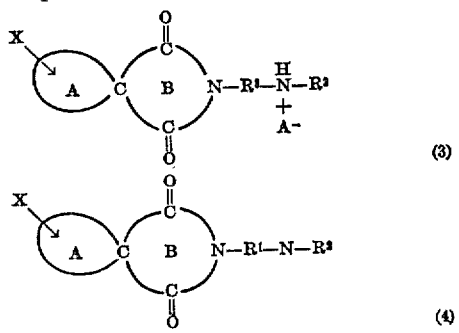

Formulas 5 and 6 illustrate the type and site of salt formation resulting from the appropriate treatment of the azaspirane bases of the present invention:

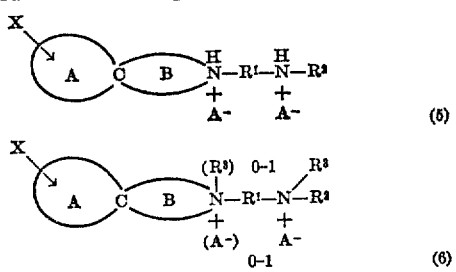

Formulas 3 and 5 illustrate the simple salt formation resulting from the salting of the imide and the basic azaspirane, respectively, with non-toxic acid anions, such as chloride, iodide, bromide, sulfate, acetate, succinate, maleate, phosphate, benzoate, lactate, thiodisalicylate, mucate, citrate, tartrate and the like. In general, those non-toxic salts of the imides and basic azaspiranes which are soluble in water or other well-tolerated solvents are particularly useful for therapeutic purposes due to the ease of administration of the salts in their dissolved form. In addition, other non-toxic salts may also be used.

Formulas 4 and 6 illustrate quaternary salt formation resulting from quaternizing the imides and basic azaspiranes with alkyl esters. As shown, $R^3$ represents an alkyl or alkylene radical of from 1 to 5 carbon atoms. $R^2$ and $R^3$ may, of course, be the same or different radicals as the case may be. The anion, $A^-$, may be any of the non-toxic anions useful in forming the simple acid addition salts as discussed above in connection with Formulas 3 and 5.

As will be noted, salting of the imides (Formulas 3 and 5) results in salt formation only at the terminal nitrogen atom whereas salting of the free bases (Formulas 4 and 6) may result in the salting of both the terminal nitrogen atom and the ring nitrogen. This, of course, is due to the lack of or difference in basicity of the ring nitrogen in both the imides and free bases. By avoiding the use of more than one molecular equivalent of the salting medium and by proper temperature control, the salts can be limited to addition at the terminal nitrogen.

The free bases and their non-toxic simple acid addition salts possess antihistaminic activity to varying degrees and have profound effects on the nervous systems. Depending upon the size and nature of rings A and B as well as the size of the substituent side chain, excitants or depressants of the nervous system may be formulated. The quaternary salts of the basic azaspiranes of the present invention possess hypotensive activity in addition to having other significant effects on the nervous system.

The quaternary salts are especially valuable as chemotherapeutic agents, having been found to be very effective in the treatment of hypertension. An effective dosage for this purpose is 3 to 10 mg. given by injection or 30 to 100 mg. orally, administered twice a day.

The following examples will serve to illustrate the novel procedures by which the azaspirane-diones, the basic azaspiranes and the simple and quaternary salts of both are formulated:

Example 1.—*N-(3-Dimethylaminopropyl)-3-Azaspiro (5:5)Undecane-2,4-Dione*

(a) Fifty g. of powdered cyclohexane-1,1-diacetic acid anhydride was placed into a 300 ml. round bottom flask. 28.5 g. of 3-dimethylaminopropylamine was added until a clear homogeneous mixture was obtained. The anhydride of the acid melted by the heat generated in the reaction and the reaction proceeded by its own heat. The reaction mixture was heated gently in an oil bath until a temperature of 180–200° was reached and maintained at this temperature for two hours. The reaction mixture was allowed to cool and then distilled in vacuo to yield 67 g. of the title product boiling at 135–141° at 0.2 mm.

(b) The imide hydrochloride was obtained in isopropyl alcohol saturated with hydrogen chloride by precipitation with ether and had an M.P. of 185–186°.

(c) The imide methiodide was prepared in isopropyl alcohol by means of methyl iodide and precipitated with ether. It melted at 260–262°.

Example 2.—*N-(3-Dimethylaminopropyl)-3-Azaspiro (5:5)Undecane*

(a) Fifteen g. of lithium aluminum hydride and 1 liter of anhydrous ether were placed into a 2-liter, 3-necked reaction flask, fitted with stirrer, dropping funnel and reflux condenser, and protected from moisture with a soda lime tube. When solution was effected, a solution of 20 g. of the imide prepared in Example 1 dissolved in 200 ml. of anhydrous ether was added over a period of 15 minutes. The reaction mixture was stirred for 3 hours and then decomposed by slow addition of water. A slight excess of water was added, the inorganic solids filtered off, the ethereal solution dried over sodium sulfate and the ether stripped. The resultant oil was distilled in vacuo to yield 15.8 g. of base boiling at 85–95° at 0.075 mm.

(b) The dihydrochloride of the base was prepared by treating an isopropanol solution of the base with ethanolic hydrogen chloride and precipitating with absolute ether. It melted after recrystallization at 305–306°.

(c) The dimethiodide of the base was prepared by refluxing an alcohol solution of the base with an excess of methyl iodide. Ethyl acetate was added until crystallization started and after cooling the product was filtered. It melted at 252–253°.

(d) The dimethiodide above was converted into the dimethonium chloride as follows. Ten g. of the dimethiodide salt was dissolved in 250 ml. of water and 30 g. of silver oxide (an excess) was added. The mixture was shaken for an hour and then filtered and washed. The highly alkaline filtrate was neutralized with hydrochloric acid and evaporated to dryness. The residue was dissolved in isopropyl alcohol-ethanol, filtered and allowed to crystallize. The product melted at 292–293°. On recrystallization from the same solvent system the product melted at 292–293°.

(e) By neutralizing the highly alkaline filtrate obtained in (d) above with a suitable acid any anion, such as tartrate, citrate, maleate, sulfate, etc., may be introduced instead of the chloride.

Example 3.—*N-(2-Dimethylaminoethyl)-3-Azaspiro- (5:5)Undecane-2,-4-Dione*

(a) The imide was prepared as in Example 1 in 89% yield from cyclohexane-1,1-diacetic acid anhydride and 2-dimethylaminoethylamine and had a boiling point of 114–124° at .1 mm.

(b) The amide hydrochloride was prepared as in Example 1 and had an M.P. of 204–205°.

(c) The imide methiodide was prepared as in Example 1 and had an M.P. of 241–242°.

*Example 4.—N-(2-Dimethylaminoethyl)-3-Azaspiro-(5:5)Undecane*

(a) Reduction of the imide of Example 3 with lithium aluminum hydride as described in Example 2 yielded the title base, an oil that boiled at 76–80° at 0.075 mm.

(b) The dihydrochloride, prepared as in Example 2, melted at 310–311°

(c) The dimethiodide, prepared as in Example 2, melted at 268–270°.

*Example 5.—N-(2-Diethylaminoethyl)-3-Azaspiro-(5:5)Undecane-2,4-Dione*

(a) The imide was prepared as in Example 1 from cyclohexane-1,1-diacetic acid anhydride and 2-diethylaminoethylamine and had a B.P. of 130–137° at 0.05 mm.

(b) The hydrochloride, prepared as in Example 1, melted at 144–145°.

(c) The methiodide, prepared as in Example 1, melted 207–208°.

*Example 6.—N-(2-Diethylaminoethyl)-3-Azaspiro-(5:5)Undecane*

(a) Reduction of the imide of Example 5 with lithium aluminum hydride as described in Example 2 yielded an oil boiling at 88–93° at 0.025 mm.

(b) The dihydrochloride prepared as in Example 2 melted at 264–265°.

(c) The dimethiodide prepared as in Example 2 melted at 245–246°.

*Example 7.—N-(3-Diethylaminopropyl)-3-Azaspiro-(5:5)Undecane-2,4-Dione*

(a) The imide was prepared as in Example 1 from cyclohexane-1,1-diacetic acid anhydride and 3-diethylaminopropylamine and had a B.P. of 155–156° at 0.1 mm.

(b) The imide hydrochloride, prepared as in Example 1, melted at 154–155°.

(c) The methiodide, prepared as in Example 1, melted at 227–228°.

*Example 8.—N-(3-Diethylaminopropyl)-3-Azaspiro-(5:5)Undecane*

(a) Reduction of the imide of Example 7 with lithium aluminum hydride as described in Example 2 yielded an oil that boiled at 103–106° at 0.1 mm.

(b) The dihydrochloride, prepared as in Example 2, melted at 278–280°.

(c) The dimethiodide, prepared as in Example 2, melted at 259–260°.

*Example 9.—N-(3-Dibutylaminopropyl)-3-Azaspiro-(5:5)Undecane-2,4-Dione*

(a) The imide was prepared as described in Example 1 from cyclohexane-1,1-diacetic acid anhydride and 3-dibutylaminopropylamine and had a B.P. of 179–190° at 0.1 mm.

(b) The imide hydrochloride, prepared as in Example 1, melted at 133–134°.

(c) The methiodide, prepared as in Example 1, melted at 135–137°.

*Example 10.—N-(3-Dibutylaminopropyl)-3-Azaspiro-(5:5)Undecane*

(a) Reduction of the imide of Example 9 with lithium aluminum hydride yielded the base as an oil that boiled at 130–134° at 0.05 mm.

(b) The dihydrochloride, prepared as in Example 2, melted at 223–224°.

(c) The dimethiodide, prepared as in Example 2, melted at 152–154°.

*Example 11.—N-(5-Diethylaminoamyl)-3-Azaspiro-(5:5)Undecane-2,4-Dione*

(a) The imide was prepared as in Example 1 from the anhydride of cyclohexane-1,1-diacetic acid and 5-diethylaminoamylamine and had a B.P. of 169–175° at 0.2 mm.

(b) The hydrochloride of the imide, prepared as in Example 1, melted at 122–123°.

(c) The methiodide, prepared as in Example 1, melted at 151–153°.

*Example 12.—N-(5-Diethylaminoamyl)-3-Azaspiro-(5:5)Undecane*

(a) Reduction of the imide of Example 11 with lithium aluminum hydride, as in Example 2, yielded the base which boiled at 124–130° at 0.075 mm.

(b) The dihydrochloride prepared as in Example 2, melted at 277–278°.

(c) The dimethiodide, prepared as in Example 2, melted at 221–223°.

*Example 13.—N-(4-Diethylamino-1-Methylbutyl)-3-Azaspiro(5:5)Undecane-2,4-Dione*

(a) The imide was prepared as described in Example 1 from cyclohexane-1,1-diacetic acid anhydride and 4-diethylamino-1-methylbutylamine and had a B.P. of 155–161° at 0.2 mm.

(b) The hydrochloride, prepared as in Example 1, melted at 117–119°.

(c) The methiodide, prepared as in Example 1, melted at 149–150°.

*Example 14.—N-(4-Diethylamino-1-Methylbutyl)-3-Azaspiro(5:5)Undecane*

(a) Reduction of the imide of Example 13, as described in Example 2, yielded the base with a boiling point of 116–122° at 0.05 mm.

(b) The dihydrochloride, prepared as in Example 2, melted at 257–258°.

(c) The dimethiodide, prepared as in Example 2, melted at 224–225°.

*Example 15.—N-(2-Piperidinoethyl)-3-Azaspiro(5:5)Undecane-2,4-Dione*

(a) The imide was prepared as in Example 1 from cyclohexane-1,1-diacetic acid anhydride and 2-piperidinoethylamine, boiling point 147–152° at 0.1 mm.

(b) The imide hydrochloride prepared as in Example 1 melted at 196–197°.

(c) The imide methiodide prepared as in Example 1 melted at 232–233°.

*Example 16.—N-(2-Piperidinoethyl)-3-Azaspiro-(5:5)Undecane*

(a) Reduction of the imide of Example 15, as described in Example 2, yielded the base as an oil bioling at 110–114° at 0.05 mm.

(b) The dihydrochloride of the above base was prepared as described in Example 2 and had an M.P. of 323–324°.

(c) The dimethiodide, prepared as in Example 2, melted at 258–260°.

(d) The sulfate of the above base was prepared by adding 0.08 mole of concentrated sulfuric acid dissolved in ethyl acetate to 0.01 mole of the base dissolved in ethyl acetate. The salt precipitated immediately and boiling ethanol was added until all was dissolved. On cooling, the sulfate salt crystallized and melted at 249–250°. Recrystallization from ethanol gave the salt with a melting point of 253–254°.

*Example 17.—N-(3-Morpholinopropyl)-3-Azaspiro-(5:5)Undecane-2,4-Dione*

(a) The imide was prepared as in Example 1 from cyclohexane-1,1-diacetic acid anhydride and 3-morpholinopropylamine and had a B.P. of 173–176° at 0.2 mm.

(b) The hydrochloride, prepared as in Example 1, melted at 182–183°.

(c) The methiodide of the imide, prepared as in Example 1, melted at 254°.

*Example 18.—N-(3-Morpholinopropyl)-3-Azaspiro-(5:5)Undecane*

(a) Reduction of the imide of Example 17, as described in Example 2, yielded the base with a boiling point of 121–125° at 0.05 mm.

(b) The dihydrochloride, prepared as in Example 2, melted at 302–303°.

(c) The dimethiodide, prepared in Example 2, melted at 245–246°.

*Example 19.—N-(3-Pyrrolidinopropyl)-3-Azaspiro-(5:5)Undecane-2,4-Dione*

(a) The title compound was prepared as described in Example 1 from cyclohexane-1,1-diacetic acid anhydride and 3-pyrrolidinopropylamine and had a B.P. of 160–165° at 0.2 mm.

(b) The imide hydrochloride prepared as in Example 1 melted at 235–236°.

(c) The imide methiodide prepared as in Example 1 melted at 235–236°.

*Example 20.—N-(3-Pyrrolidinopropyl)-3-Azaspiro-(5:5)Undecane*

(a) The reduction of the imide of Example 19 as described in Example 2 gave the desired base with a boiling point of 103–113° at 0.025 mm.

(b) The dihydrochloride, prepared as described in Example 2, melted at 305–307°.

(c) The dimethiodide, prepared as in Example 2, melted at 248–250°.

*Example 21.—N-(3-Dihexylaminopropyl)-3-Azaspiro-(5:5)Undecane-2,4-Dione*

The imide was prepared as outlined in Example 1 from the anhydride of cyclohexane-1,1-diacetic acid and 3-dihexylaminopropylamine and had a B.P. of 202–208° at 0.1 mm.

*Example 22.—N-(3-Dihexylaminopropyl)-3-Azaspiro(5:5)Undecane*

Reduction of the imide of Example 21 as outlined in Example 2 yielded the desired base with a B.P. of 158–162° at 0.1 mm.

*Example 23.—N-(6-Diethylaminohexyl)-3-Azaspiro-(5:5)Undecane-2,4-Dione*

The desired imide was prepared as described in Example 1 from the anhydride of cyclohexane-1,1-diacetic acid and 6-diethylaminohexylamine and had a B.P. of 179–184° at 0.2 mm.

*Example 24.—N-(6-Diethylaminohexyl)-3-Azaspiro(5:5)Undecane*

Reduction of the above imide of Example 23 as described in Example 2 yielded the desired base with a boiling point of 128–136° at 0.07 mm.

*Example 25.—N-(3-Dimethylaminopropyl)-8-Methyl-3-Azaspiro(5:5)Undecane-2,4-Dione*

(a) The imide was prepared as described in Example 1 from 3-methylcyclohexane-1,1-diacetic acid anhydride and 3-dimethylaminopropylamine and had B.P. of 132–136° at 0.1 mm.

(b) The imide hydrochloride, prepared as described in Example 1, melted at 182–183°.

(c) The imide methiodide, prepared as in Example 1, melted at 252–253°.

*Example 26.—N-(3-Dimethylaminopropyl)-8-Methyl-3-Azaspiro(5:5)Undecane*

(a) Reduction of the imide of Example 25 with lithium aluminum hydride as described in Example 2 yielded the title base with a boiling point of 86–88° at 0.12 mm.

(b) The dihydrochloride, prepared as in Example 2, melted at 304–305°.

(c) The dimethiodide, prepared as in Example 2, melted at 267–268°.

*Example 27.—N-(3-Dimethylaminopropyl)-9-Methyl-3-Azaspiro(5:5)Undecane-2,4-Dione*

(a) The imide was prepared as outlined in Example 1 from 4-methylcyclohexane-1,1-diacetic acid anhydride and 3-dimethylaminopropylamine and had a B.P. of 137–140° at 0.2 mm.

(b) The imide hydrochloride, prepared as described in Example 1, melted at 131–132°.

(c) The imide methiodide, prepared as described in Example 1, melted at 243–244°.

*Example 28.—N-(3-Dimethylaminopropyl)-9-Methyl-3-Azaspiro(5:5)Undecane*

(a) Reduction of the imide of Example 27, as described in Example 2, gave the base with a boiling point of 95–98° at 0.18 mm.

(b) The base dihydrochloride, prepared as described in Example 2, melted at 302–30°.

(c) The dimethiodide, prepared as in Example 2, melted at 255–256°.

*Example 29.—N-(3-Dimethylaminopropyl)-2-Azaspiro-(4:4)Nonane-1,3-Dione*

(a) The imide was prepared as described in Example 1 from cyclopentane-1-carboxy-1-acetic acid anhydride and 3-dimethylaminopropylamine and had a B.P. of 105–110° at 0.05 mm.

(b) The imide hydrochloride, prepared as described in Example 1, melted at 133–135°.

(c) The methiodide, prepared as in Example 1, melted at 183–184°.

*Example 30.—N-(3-Dimethylaminopropyl)-2-Azaspiro-(4:4)Nonane*

(a) Reduction of the imide of Example 29 as described in Example 2 gave the base with a boiling point of 92–95°, at 1.0 mm.

(b) The dihydrochloride prepared as in Example 2, melted at 264–265°.

(c) The dimethiodide, prepared as in Example 2, melted at 247–248°.

*Example 31.—N-(2-Dimethylaminoethyl)-2-Azaspiro-(4:4)Nonane-1,3-Dione*

(a) The imide was prepared as described in Example 1 from the anhydride of cyclopentane-1-carboxy-1-acetic acid and 2-dimethylamino-ethylamine and had a B.P. of 93–98° at 0.05 mm.

(b) The imide hydrochloride, prepared as in Example 2, melted at 186–187°.

(c) The methiodide, prepared as in Example 2, melted at 172–173°.

*Example 32.—N-(2-Dimethylaminoethyl)-2-Azaspiro-(4:4)Nonane*

(a) Reduction of the imide of Example 31 as described in Example 2 gave the base with a boiling point of 70–72° at 0.45 mm.

(b) The dihydrochloride, prepared as in Example 2, melted at 273–274°.

(c) The dimethiodide, prepared as in Example 2, melted at 228–230°.

*Example 33.—N-(3-Morpholinopropyl)-2-Azaspiro-(4:4)Nonane-1,3-Dione*

(a) The imide was prepared as in Example 1 from the anhydride of cyclopentane-1-carboxy-1-acetic acid and 3-morpholinopropylamine and had a B.P. of 163–168° at 0.1 mm.

(b) The imide hydrochloride, prepared as in Example 1, melted at 170°.

(c) The imide methiodide, prepared as in Example 1, melted at 183–184°.

*Example 34.—N-(3-Morpholinopropyl)-2-Azaspiro-(4:4)Nonane*

(a) The imide of Example 33 was reduced as described in Example 2 and gave the base in 86% yield which boiled at 103–108° at 0.1 mm.

(b) The dihydrochloride, prepared as in Example 2, melted at 255–256°.

(c) The dimethiodide, prepared as in Example 2, melted at 219–220°.

*Example 35.—N-(3-Pyrrolidinopropyl)-2-Azaspiro-(4:4)Nonane-1,3-Dione*

(a) The imide was prepared as described in Example 1 from the anhydride of cyclopentane-1-carboxy-1-acetic acid and 3-pyrrolidinopropylamine with a boiling point of 143–151° at 0.05 mm.

(b) The imide hydrochloride, prepared as in Example 1, melted at 187–188°.

(c) The methiodide of the imide, prepared as in Example 1, melted at 147°.

*Example 36.—N-(3-Pyrrolidinopropyl)-2-Azaspiro-(4:4)Nonane*

(a) Reduction of the imide of Example 35 as described in Example 2 gave the base boiling at 94–99° at 0.025 mm.

(b) The dihydrochloride, prepared as in Example 2, melted at 246–247°.

(c) The dimethiodide, prepared as in Example 2, melted at 235–236°.

*Example 37.—N-(2-Piperidinoethyl)-2-Azaspiro-(4:4)Nonane-1,3-Dione*

(a) The imide was prepared in Example 1 from the anhydride of cyclopentane-1-carboxy-1-acetic acid and 2-piperidinoethylamine and had a B.P. of 143–148° at 0.05 mm. It solidified and on recrystallization melted at 65–66°.

(b) The imide hydrochloride, prepared as in Example 1, melted at 173–74°.

(c) The imide methiodide, prepared as in Example 2, melted at 177–178°.

*Example 38.—N-(2-Piperidinoethyl)2-Azaspiro-(4:4)Nonane*

(a) Reduction of the imide of Example 37 as described in Example 2 yielded the base with a boiling point of 85–95° at 0.03 mm.

(b) The dihydrochloride, prepared as in Example 2, melted at 307°.

(c) The dimethiodide, prepared as in Example 2, melted at 236–237°.

*Example 39.—N-(3-Dimethylaminopropyl)-7-Methyl-2-Azaspiro(4:4)Nonane-1,3-Dione*

(a) The imide was prepared by reaction of the anhydride of 3-methylcyclopentane-1-carboxy-1-acetic acid with 3-dimethylaminopropylamine as described in Example 1 and had a B.P. of 121–123° at 0.35 mm.

(b) The imide hydrochloride, prepared as described in Example 1, melted at 146–147°.

(c) The imide methiodide, prepared as described in Example 1, melted at 137–138°.

*Example 40.—N-(3-Dimethylaminopropyl)-7-Methyl-2-Azaspiro(4:4)Nonane*

(a) The base was obtained by reduction of the imide of Example 39 described in Example 2 with a B.P. of 77–78° at 0.1 mm.

(b) The dihydrochloride, prepared as in Example 2, melted at 279–280°.

(c) The dimethiodide, prepared as in Example 2, melted at 250–251°.

*Example 41.—N-(3-Morpholinopropyl)-7-Methyl-2-Azaspiro (4:4)Nonane-1,3-Dione*

(a) The imide was prepared as in Example 1 from the anhydride of 3-methylcyclopentane-1-carboxy-1-acetic acid and 3-morpholinopropylamine with a B.P. of 153–158° at 0.04 mm.

(b) The imide hydrochloride, prepared as in Example 1, melted at 139–140°.

(c) The imide methiodide, prepared as in Example 1, melted at 168–169°.

*Example 42.—N-(3-Morpholinopropyl)-7-Methyl-2-Azaspiro(4:4)Nonane*

(a) The base was obtained by reduction of the imide of Example 41 with lithium aluminum hydride as described in Example 2 with a boiling point of 91–93° at 0.04 mm.

(b) The dihydrochloride, prepared as in Example 2, melted at 265–266°.

(c) The dimethiodide, prepared as in Example 2, melted at 209–210°.

*Example 43.—N-(3-Dimethylaminopropyl)-8-Azaspiro (4:5)Decane-7,9-Dione*

(a) The imide was prepared as in Example 1 from the anhydride of cyclopentane-1,1-diacetic acid and 3-dimethylaminopropylamine with a boiling point of 127–130° at 0.075 mm.

(b) The imide hydrochloride, prepared as in Example 1 melted at 144–145°.

(c) The imide methiodide, prepared as in Example 1, melted at 254–255°.

*Example 44.—N-(3-Dimethylaminopropyl)-8-Azaspiro (4:5)Decane*

(a) The base was obtained by reduction of the imide of Example 43 as described in Example 2 with a boiling point of 88–94° at 0.25 mm.

(b) The dihydrochloride, prepared as in Example 2, melted at 291–293°.

(c) The dimethiodide, prepared as in Example 2, melted at 243–244°.

*Example 45.—N-(2-Dimethylaminoethyl)-8-Azaspiro (4:5)Decane-7,9-Dione*

(a) The imide was prepared as in Example 1 from the anhydride of cyclopentane-1,1-diacetic acid and 2-dimethylaminoethylamine with a boiling point of 115–119° at 0.075 mm.

(b) The imide hydrochloride, prepared as in Example 1, melted at 189–190°.

(c) The imide methiodide, prepared as in Example 1, melted at 188–189°.

*Example 46.—N-(2-Dimethylaminoethyl)-8-Azaspiro (4:5)Decane*

(a) Reduction of the imide of Example 45 as described in Example 2 yielded the base boiling at 75–78° at 0.2 mm.

(b) The dihydrochloride, prepared as in Example 2, melted at 313–314°.

(c) The dimethiodide, prepared as in Example 2, melted at 250–251°.

*Example 47.—N-(2-Piperidinoethyl)-8-Azaspiro(4:5) Decane-7,9-Dione*

(a) The imide was prepared as described in Example 1 from the anhydride of cyclopentane-1,1-diacetic acid and 2-piperidinoethylamine with a B.P. of 138–146° at 0.075 mm.

(b) The imide hydrochloride, prepared as in Example 1, melted at 179–180°.

(c) The imide methiodide, prepared as in Example 1, melted at 181–182°.

*Example 48.—N-(2-Piperidinoethyl)-8-Azaspiro(4:5) Decane*

(a) Reduction of the imide of Example 47 as described in Example 2 yielded the base boiling at 100–108° at 0.05 mm.

(b) The dihydrochloride, prepared as in Example 2, melted at 342–343°.

(c) The dimethiodide, prepared as in Example 2, melted at 247–248°.

*Example 49.—N-(3-Pyrrolidinopropyl)-8-Azaspiro(4:5) Decane-7,9-Dione*

(a) The imide was prepared as described in Example 1 from the anhydride of cyclopentane-1,1-diacetic acid and 3-pyrrolidinopropylamine with a B.P. of 144–148° at 0.05 mm.

(b) The imide hydrochloride, prepared as in Example 1 melted at 224–225°.

(c) The imide methiodide, prepared as in Example 1, melted at 178–179°.

*Example 50.—N-(3-Pyrrolidinopropyl)-8-Azaspiro(4:5) Decane*

(a) The base was obtained by reduction of the imide of Example 49 as described in Example 2 with a B.P. of 102–107° at 0.05 mm.

(b) The dihydrochloride, prepared as in Example 2, melted at 307–308°.

(c) The dimethiodide, prepared as in Example 2, melted at 246–247°.

*Example 51.—N-(3-Morpholinopropyl)-8-Azaspiro(4:5)Decane-7,9-Dione*

(a) The imide was prepared as described in Example 1, from the anhydride of cyclopentane-1,1-diacetic acid and 3-morpholinopropylamine with a B.P. of 166–173° at 0.05 mm.

(b) The imide hydrochloride, prepared as in Example 2, melted at 196–197°.

(c) The imide methiodide, prepared as in Example 2, melted at 237–238°.

*Example 52.—N-(3-Morpholinopropyl)-8-Azaspiro(4:5)Decane*

(a) Reduction of the imide of Example 51 as described in Example 1 yielded the base boiling at 106–116° at 0.025 mm.

(b) The dihydrochloride, prepared as in Example 2, melted at 302–303°.

(c) The dimethiodide, prepared as in Example 2, melted at 232–233°.

*Example 53.—N-(3-Dimethylaminopropyl)-2-Methyl-8-Azaspiro(4:5)Decane-7,9-Dione*

(a) The imide base was prepared as described in Example 1 from the anhydride of 3-methylcyclopentane-1,1-diacetic acid and 3-dimethylaminopropylamine with a B.P. of 129–131° at 0.15 mm.

(b) The imide hydrochloride, prepared as in Example 1, melted at 156–157° C.

(c) The imide methiodide, prepared as in Example 1, melted at 266–267° C.

*Example 54.—N-(3-Dimethylaminopropyl)-2-Methyl-8-Azaspiro(4:5)Decane*

(a) The base was prepared as described in Example 2 by reduction of the imide of Example 53 with lithium aluminum hydride with a B.P. of 81–86° at 0.025 mm.

(b) The dihydrochloride, prepared as in Example 2, melted at 309–310°.

(c) The dimethiodide, prepared as in Example 2, melted at 255–256°.

*Example 55.—N-(3-Dimethylaminoethyl)-2-Azaspiro(4:5)Decane-1,3-Dione*

(a) The imide was prepared as described in Example 1 from the anhydride of cyclohexane-1-carboxy-1-acetic acid and 2-dimethylamino-ethylamine with a B.P. of 106–112° at 0.05 mm.

(b) The imide hydrochloride, prepared as in Example 1, melted at 210–211°.

(c) The imide methiodide, prepared as in Example 1, melted at 194–195°.

*Example 56.—N-(2-Dimethylaminoethyl)-2-Azaspiro(4:5)Decane*

(a) The base was prepared by reduction of the imide of Example 55 as described in Example 2 with a B.P. of 80–82° at 0.5 mm.

(b) The dihydrochloride, prepared as in Example 2, melted at 286–287°.

(c) The dimethiodide, prepared as in Example 2, melted at 226–227°.

*Example 57.—N-(3-Dimethylaminopropyl)-2-Azaspiro(4:5)Decane-1,3-Dione*

(a) The imide was prepared from the anhydride of cyclohexane-1-carboxy-1-acetic acid and 3-dimethylaminopropylamine as described in Example 1 with a B.P. of 118–124° at 0.075 mm.

(b) The imide hydrochloride, prepared as described in Example 1, melted at 177–178°.

(c) The imide methiodide, prepared as described in Example 1, melted at 176–177°.

*Example 58.—N-(3-Dimethylaminopropyl)-2-Azaspiro(4:5)Decane*

(a) The base was prepared by reduction of the imide of Example 57 as described in Example 2 with a B.P. of 73–78° at 0.1 mm.

(b) The dihydrochloride, prepared as in Example 2, melted at 283–284°.

(c) The dimethiodide, prepared as in Example 2, melted at 251–252°.

*Example 59.—N-(2-Piperidinoethyl)-2-Azaspiro(4:5)Decane-1,3-Dione*

(a) The imide was prepared as described in Example 1 from the anhydride of cyclohexane-1-carboxy-1-acetic acid and 2-piperidinoethylamine with a B.P. of 154–157° at 0.25 mm.

(b) The imide hydrochloride, prepared as in Example 1, melted at 185–186°.

(c) The imide methiodide, prepared as in Example 1, melted at 199–200°.

*Example 60.—N-(2-Piperidinoethyl)-2-Azaspiro(4:5)Decane*

(a) The base was prepared as described in Example 2 by reduction of the imide of Example 59 with a B.P. of 95–105° at 0.05 mm.

(b) The dihydrochloride, prepared as in Example 2, melted at 316–317°.

(c) The dimethiodide, prepared as in Example 2, melted at 227–228°.

*Example 61.—N-(3-Pyrrolidinopropyl)-2-Azaspiro(4:5)Decane-1,3-Dione*

(a) The imide was prepared as described in Example 1 from the anhydride of cyclohexane-1-carboxy-1-acetic acid and 3-pyrrolidinopropylamine with a B.P. of 146–154° at 0.05 mm.

(b) The imide hydrochloride, prepared as in Example 1, and melted at 234–235°.

(c) The imide methiodide, prepared as in Example 1, melted at 132–133°.

Example 62.—N-(3-Pyrrolidinopropyl)-2-Azaspiro(4:5)Decane (a) The base was prepared as described in Example 2 by reduction of the imide of Example 61 with a B.P. of 99–103° at 0.05 mm.

(b) The dihydrochloride, prepared as in Example 2, melted at 271–272°.

(c) The dimethiodide, prepared as in Example 2, melted at 239–240°.

Example 63.—N-(3-Morpholinopropyl)-2-Azaspiro(4:5)Decane-1,3-Dione (a) The imide was prepared as in Example 1 from the anhydride of cyclohexane-1-carboxy-1-acetic acid and 3-morpholinopropylamine with a B.P. of 160–165° at 0.05 mm.

(b) The imide hydrochloride, prepared as in Example 1, melted at 197–198°.

(c) The imide methiodide, prepared as in Example 1, melted at 187–188°.

Example 64.—N-(3-Morpholinopropyl)-2-Azaspiro(4:5)Decane (a) The base was prepared as described in Example 2 by reduction of the imide of Example 63 with a B.P. of 113–122° at 0.05 mm.

(b) The dihydrochloride, prepared as in Example 2, melted at 277–278°.

(c) The dimethiodide, prepared as in Example 2, melted at 237–238°.

Example 65.—N-(3-Dimethylaminopropyl)-7-Methyl-2-Azaspiro(4:5)Decane-1,-Dione (a) The imide was prepared as described in Example 1 from the anhydride of 3-methyl-cyclohexane-1-carboxy-1-acetic acid and 3-dimethylaminopropylamine with a B.P. of 117–122° at 0.25 mm.

(b) The imide hydrochloride, prepared as in Example 1, melted at 172–173°.

(c) The imide methiodide, prepared as in Example 1, melted at 118–120°.

Example 66.—N-(3-Dimethylamino-Propyl)-7-Methyl-2-Azaspiro(4:5)Decane (a) The base was obtained by reduction of the imide of Example 65 as described in Example 2 with a B.P. of 82–84° at 0.23 mm.

(b) The dihydrochloride, prepared as in Example 2, melted at 264–265°.

(c) The dimethiodide, prepared as in Example 2, melted at 258–259°.

Example 67.—N-(3-Dimethylaminopropyl)-3-Azaspiro(5:6)Dodecane-2,4-Dione (a) The imide was prepared as described in Example 1 from the anhydride of cycloheptane-1,1-diacetic acid and 3-dimethylaminopropylamine in 72% yield with a B.P. of 145–147° at 0.08 mm.

(b) The imide hydrochloride, prepared as in Example 1, melted at 159–160°.

(c) The imide methiodide, prepared as in Example 1, melted at 248–249°.

Example 68.—N-(3-Dimethylaminopropyl)-3-Azaspiro(5:6)Dodecane (a) The base was obtained as described in Example 2 by reduction of the imide of Example 67 with a B.P. of 108–113° at 0.1 mm.

(b) The dihydrochloride, prepared as in Example 2, melted at 308–309°.

(c) The dimethiodide, prepared as in Example 2, melted at 258–259°.

Example 69.—N-(3-Dimethylaminopropyl)-2-Azaspiro(4:6)Undecane-1,3-Dione (a) The imide was prepared as in Example 1 from the anhydride of cycloheptane-1-carboxy-1-acetic acid and 3-dimethylaminopropylamine with a B.P. of 133–135° at 0.1 mm.

(b) The imide hydrochloride prepared as in Example 1, melted at 187–188°.

(c) The imide methiodide prepared as in Example 1, melted at 193–194°.

Example 70.—N-(3-Dimethylaminopropyl)-2-Azaspiro(4:6)Undecane (a) The base was prepared by reduction of the imide of Example 69 as described in Example 2 with a B.P. of 83–89° at 0.05 mm.

(b) The dihydrochloride, prepared as in Example 2, melted at 280–281°.

(c) The dimethiodide, prepared as in Example 2, melted at 257–258°.

Example 71.—N-(3-Dimethylaminopropyl)-Spiro-Trans-Hexahydrohydrindene(2:4')-Piperidine-2',6'-Dione (a) The imide was prepared as described in Example 1 from the anhydride of trans-hexahydrohydrindene-2,2-diacetic acid and 3-dimethylaminopropylamine with a B.P. of 153–157° at 0.1 mm.

(b) The hydrochloride of the imide, prepared as in Example 1, melted at 224–225°.

(c) The imide methiodide, prepared as in Example 1, melted at 245–246°.

Example 72.—N-(3-Dimethylaminopropyl)-Spiro-Trans-Hexahydrohydrindene(2:4')-Piperidine (a) Reduction of the imide of Example 71 described in Example 2 yielded the base with a boiling point of 118–122° at 0.15 mm.

(b) The dihydrochloride, prepared as in Example 2, melted at 327–328°.

(c) The dimethiodide, prepared as in Example 2, melted at 285–286°.

Example 73.—N-(3-Dimethylaminopropyl)-Spiro-Trans-Hexahydrohydrindene(2:3')-Pyrrolidine-2',5'-Dione (a) The imide was prepared as outlined in Example 1 from the anhydride of trans-hexahydrodrindene-2-carboxy-2-acetic acid and 3-dimethylaminopropylamine with a B.P. of 142–146° at 0.1 mm.

(b) The imide hydrochloride, prepared as in Example 1, melted at 216–217°.

(c) The methiodide of the imide, prepared as in Example 1, melted at 234–235°.

Example 74.—N-(3-Dimethylaminopropyl)-Spiro-Trans-Hexahydrohydrindene(2:3')-Pyrrolidine (a) Reduction of the imide of Example 73 as described in Example 2 yielded the base boiling at 112–115° at 0.15 mm.

(b) The dihydrochloride, prepared as in Example 2, melted at 283–284°.

(c) The dimethiodide, prepared as in Example 2, melted at 246–247°.

Example 75.—N-(3-Dimethylaminopropyl)-Spiro-Trans-Decalin(2:4')-Piperidine-2',6'-Dione (a) The imide was prepared as described in Example 1 from the anhydride of trans-decalin-2,2-diacetic acid and 3-dimethylaminopropylamine with a B.P. of 170–178° at 0.025 mm. It solidified in the receiver and melted at 59–60°.

(b) The imide hydrochloride, prepared as in Example 1, melted at 167–168°.

(c) The imide methiodide, prepared as in Example 1, melted at 244–245°.

Example 76.—N-(3-Dimethylaminopropyl)-Spiro-Trans-Decalin(2:4')-Piperidine (a) The base was prepared by reduction of the imide of Example 75 as described in Example 2 with a B.P. of 124–129° at 0.05 mm.

(b) The dihydrochloride, prepared as in Example 2, melted at 319–320°.

(c) The dimethiodide, prepared as in Example 2, melted at 279–280°.

*Example 77.—N-(3-Dimethylaminopropyl)-Spiro-Trans-Decalin(2:3')-Pyrrolidine-2',5'-Dione*

The imide was prepared as outlined in Example 1 from the anhydride of trans-decalin-2-carboxy-2-acetic acid and 3-dimethylaminopropylamine with a B.P. of 138–148° at 0.025 mm.

*Example 78.—N-(3-Dimethylaminopropyl)-Spiro-Trans-Decalin(2:3')-Pyrrolidine*

(a) The base was prepared by reduction of the imide of Example 77 as described in Example 2 with a B.P. of 120–122° at 0.2 mm.

(b) The dihydrochloride, prepared as in Example 2, melted at 285–286°.

(c) The dimethiodide, prepared as in Example 2, melted at 257–258°.

*Example 79.—N-(3-Dimethylaminopropyl)-8-Methyl-2-Azaspiro(4:5)Decane-1,3-Dione*

(a) The imide was prepared as described in Example 1 from the anhydride of 4-methylcyclohexane-1-carboxy-1-acetic acid and 3-dimethylaminopropylamine with a B.P. of 115–117° at 0.2 mm.

(b) The imide methiodide was prepared as in Example 1, melted at 135–136°.

(c) The imide hydrochloride, prepared as in Example 1, melted at 195–196°.

*Example 80.—N-(3-Dimethylaminopropyl)-8-Methyl-2-Azaspiro(4:5)Decane*

(a) The title base was obtained by reduction of the imide of Example 79 with a B.P. of 78–80° at 0.18 mm.

(b) The dimethiodide, prepared as described in Example 2, melted at 256–257°.

(c) The dihydrochloride, prepared as described in Example 2, melted at 274–275°.

*Example 81.—N-(3-Dimethylaminopropyl)-9-Methoxy-3-Azaspiro(5:5)Undecane-2,4-Dione*

(a) The imide was prepared as outlined in Example 1 from 4-methoxycyclohexane-1,1-diacetic acid anhydride and dimethylaminopropylamine and had a boiling point of 135–139° at 0.15 mm.

(b) The hydrochloride was prepared as in Example 1 and melted at 191–192°.

(c) The methiodide was prepared as in Example 1 and melted at 233–235°.

*Example 82.—N-(3-Dimethylaminopropyl)-9-Methoxy-3-Azaspiro(5:5)Undecane*

(a) Reduction of the imide of Example 81 as described in Example 2 gave the base with a boiling point of 93–97° at 0.05 mm.

(b) The dimethiodide was prepared as in Example 2 and melted at 245–246°.

*Example 83.—N-(3-Diethylaminopropanol-2)-2-Azaspiro(4:4)Nonane-1,3-Dione*

(a) The imide was prepared as outlined in Example 1 from the anhydride of cyclopentane-1-carboxy-1-acetic acid and 1-amino-3-dimethylaminopropanol-2 and had a boiling point of 143–146° at 0.13 mm.

(b) The hydrochloride was prepared as in Example 1 and melted at 137–139°.

(c) The methiodide was prepared as in Example 1 and melted at 96–98°.

*Example 84.—N-(3-Diethylaminopropanol-2)-2-Azaspiro(4:4)Nonane*

(a) Reduction of the imide of Example 83 as described in Example 2 gave the base with a boiling point of 90–91° at 0.18 mm.

(b) The dimethiodide prepared as in Example 2 was obtained as a tacky solid of indefinite melting point.

(c) The dihydrochloride, prepared as in Example 2, melted at 177–178°.

*Example 85.—N-Dimethylaminopropyl-9-t-Butyl-3-Azaspiro(5:5)Undecane-2,4-Dione*

(a) The imide was prepared as outlined in Example 1 from the anhydride of 4-t-butyl-cyclohexane-1,1-diacetic acid and dimethylaminopropylamine and had a boiling point of 155–165° at 0.05 mm.

(b) The hydrochloride was prepared as in Example 1 and melted at 177–178°.

(c) The methiodide was prepared as in Example 1 and melted at 279–281°.

*Example 86.—N-Dimethylaminopropyl-9-t-Butyl-3-Azaspiro(5:5)Undecane*

(a) Reduction of the imide of Example 85 as described in Example 2 gave the base with a boiling point of 128–133° at 0.025 mm.

(b) The dimethiodide, prepared as in Example 2, was obtained as a solid having a melting point of 285–286°.

(c) The dihydrochloride, prepared as in Example 2, melted at 335–336°.

Still other compounds may be made within the general formulae set forth above, i.e, N-(3-dimethylaminopropyl)-3-azaspiro(14:5)eicosane, N-(3-dimethylaminopropyl-3-azaspiro-(23:5)octacosane, etc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of synthesizing N-substituted azaspirodiones comprising reacting a primary amine of the formula

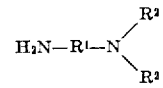

wherein R¹ is selected from the group consisting of lower alkylene and lower alkylene chains substituted by a hydroxyl group on a carbon atom at least beta to either nitrogen and

is selected from the group consisting of di-lower alkyl amino and heterocyclic radicals selected from the group consisting of morpholino, piperidino, pyrrolidino, piperazino, and lower alkyl-substituted derivatives of said heterocyclic radicals, with anhydride of the formula

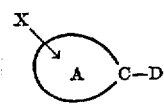

wherein A is selected from the group consisting of mono- and bicyclic carbon rings of at least 5 carbon atoms, X is at least one of the group consisting of hydrogen, alkyl and alkoxy, and D is selected from the group consisting of gem-diacetic anhydride and gem-carboxyacetic anhydride, to obtain the corresponding amic acid; and heating the amic acid sufficiently to cyclize the acid to the corresponding imide.

2. A method of synthesizing azaspiranes comprising reducing the imide obtained by the method set forth in claim 1 to the corresponding azaspirane.

3. A compound selected from the group consisting of (1) compounds of the formula

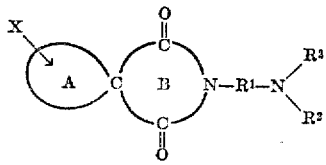

wherein A is selected from the group consisting of mono- and bicyclic carbon rings of at least 5 carbon atoms, X is at least one of the group consisting of hydrogen, alkyl and alkoxy, B is a saturated ring of 5 to 6 atoms one of which is nitrogen and the rest of which are carbon, the nitrogen atom being at least one carbon atom removed from the spiro carbon atom joining rings A and B and the alpha, alpha' carbon atoms to the nitrogen atom being carbonyl carbons, $R^1$ is selected from the group consisting of lower alkylene and lower alkylene chains substituted by a hydroxyl group on a carbon atom at least beta to either nitrogen, and

is selected from the group consisting of di-lower alkyl amino and heterocyclic radicals selected from the group consisting of morpholino, piperidino, pyrrolidino, piperazino, and lower alkyl substituted derivatives of said heterocyclic radicals; (2) the pharmaceutically acceptable non-toxic monoquaternary salts of compounds (1) having the formula

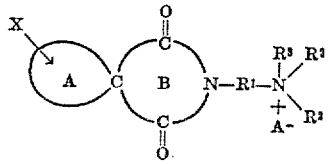

wherein $R^3$ is selected from the group consisting of alkyl of 1 to 6 carbon atoms and $A^-$ is a pharmaceutically acceptable non-toxic anion; and (3) the pharmaceutically acceptable non-toxic acid addition salts of compounds (1).

4. A compound selected from the group consisting of (1) compounds of the formula

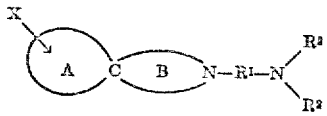

wherein A is selected from the group consisting of mono- and bicyclic carbon rings of at least 5 carbon atoms, X is at least one of the group consisting of hydrogen, alkyl and alkoxy, B is a saturated ring of 5 to 6 atoms one of which is nitrogen and the others of which are carbon, the nitrogen atom being at least one carbon atom removed from the spiro carbon atom joining rings A and B, $R^1$ is selected from the group consisting of lower alkylene and lower alkylene chains substituted by a hydroxyl group on a carbon atom at least beta to either nitrogen, and

is selected from the group consisting of di-lower alkyl amino and heterocyclic radicals selected from the group consisting of morpholino, piperidino, pyrrolidino, piperazino, and lower alkyl-substituted derivatives of said heterocyclic radicals; (2) the pharmaceutically acceptable non-toxic di-quaternary salts of compounds (1) having the formula

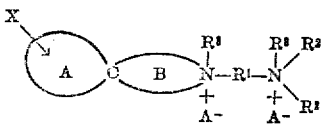

wherein $R^3$ is selected from the group consisting of alkyl of 1 to 6 carbon atoms and $A^-$ is a pharmaceutically acceptable non-toxic anion; (3) the pharmaceutically acceptable non-toxic monoquaternary salts of compounds (1) having the formula

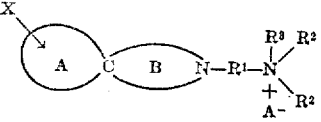

wherein $R^3$ is selected from the group consisting of alkyl of 1 to 6 carbon atoms and $A^-$ is a pharmaceutically acceptable non-toxic anion; and (4) the pharmaceutically acceptable non-toxic acid addition salts of compounds (1).

References Cited in the file of this patent

FOREIGN PATENTS 823,338    Great Britain _____ Nov. 11, 1959

UNITED STATES PATENT OFFICE
CERTIFICATE OF CORRECTION

Patent No. 3,106,552            October 8, 1963

Charles H. Grogan et al.

It is hereby certified that error appears in the above numbered patent requiring correction and that the said Letters Patent should read as corrected below.

Column 3, lines 4 to 15, formulae (3) and (4) should appear as shown below instead of as in the patent:

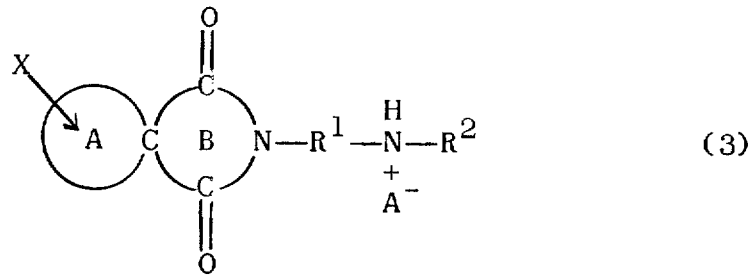 (3)

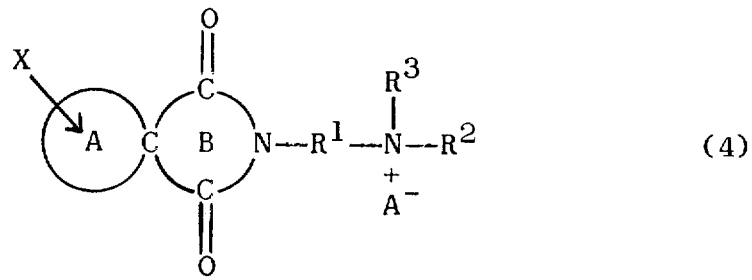 (4)

same column 3, lines 26 to 30, formula (6) should appear as shown below instead of as in the patent:

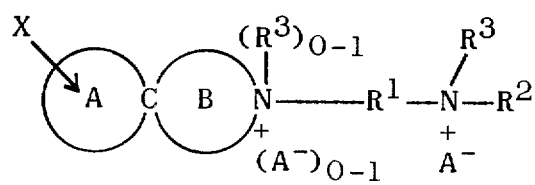

same column 3, line 53, for "5" read -- 4 --; line 54, for "4" read -- 5 --; column 9, line 39, after "prepared" insert 3,106,552

-- as --; column 10, line 43, for "293°" read -- 292° --; column 11, line 4, strike out "LL"; column 13, line 32, after "1," insert -- 3 --; column 15, line 66, for "dimethylaminopropanol" read -- diethylaminopropanol --; column 16, line 62, before "anhydride" insert -- an --.

Signed and sealed this 26th day of May 1964.

(SEAL)
Attest:

ERNEST W. SWIDER
Attesting Officer

EDWARD J. BRENNER
Commissioner of Patents